Patented May 1, 1951

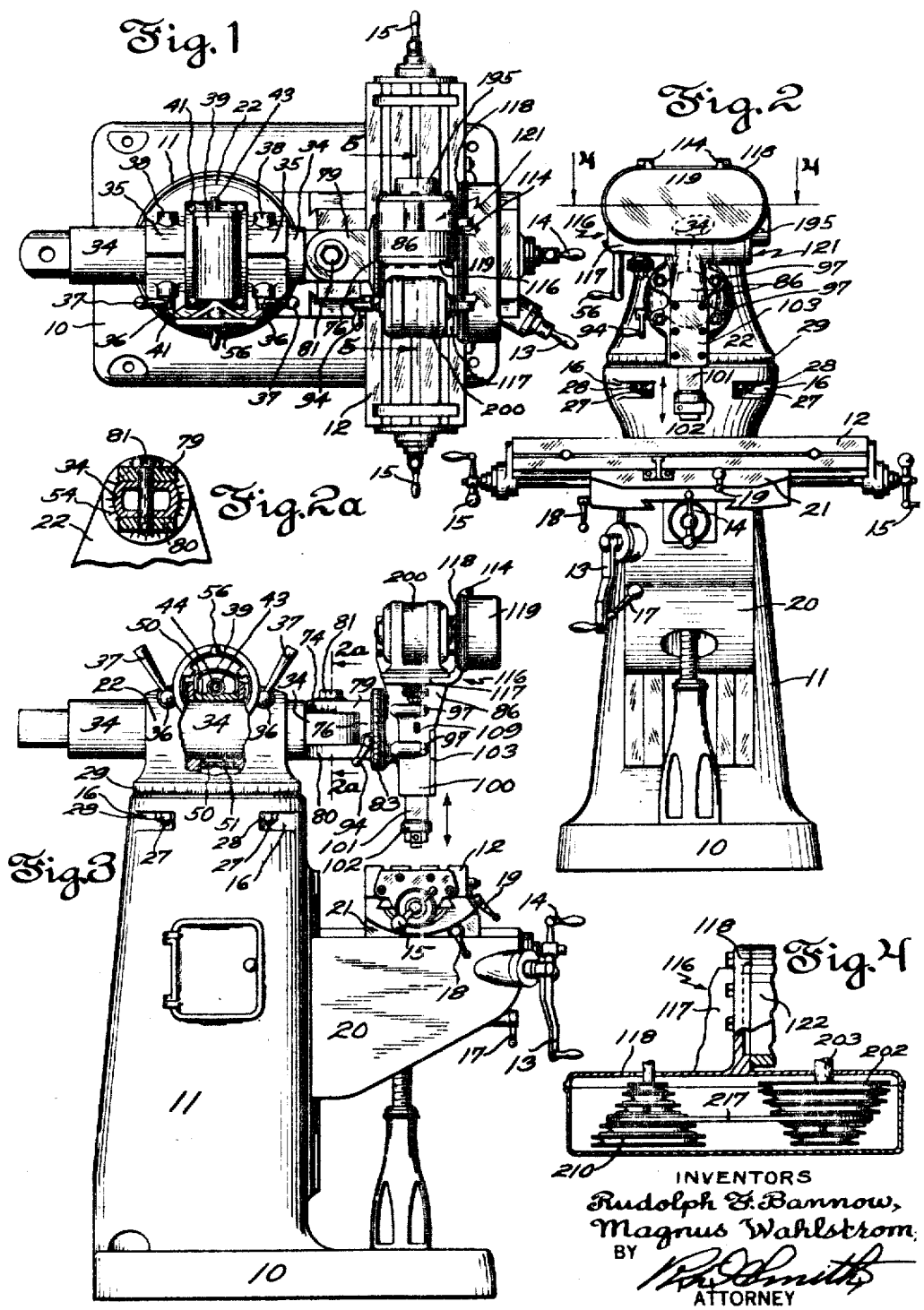

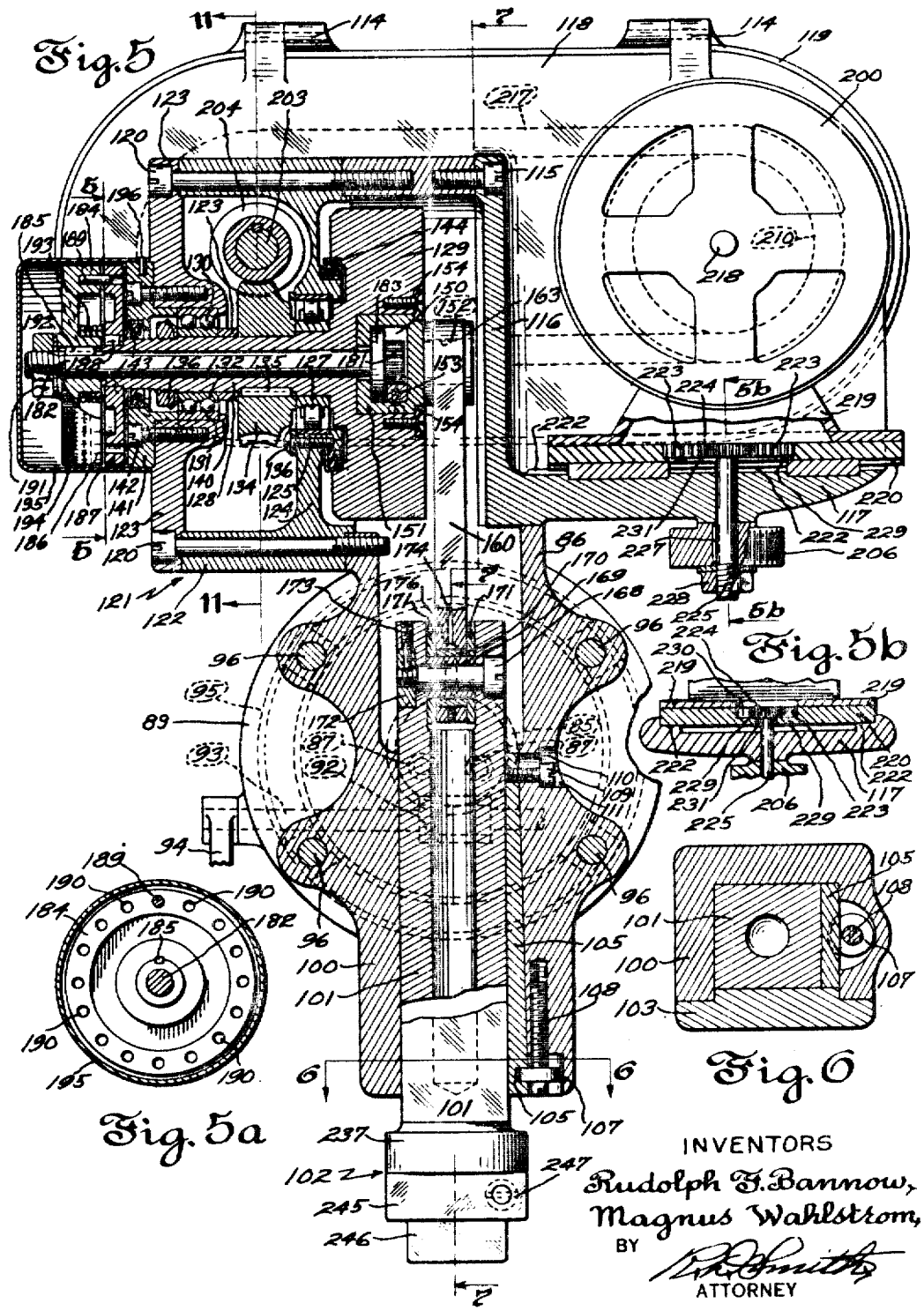

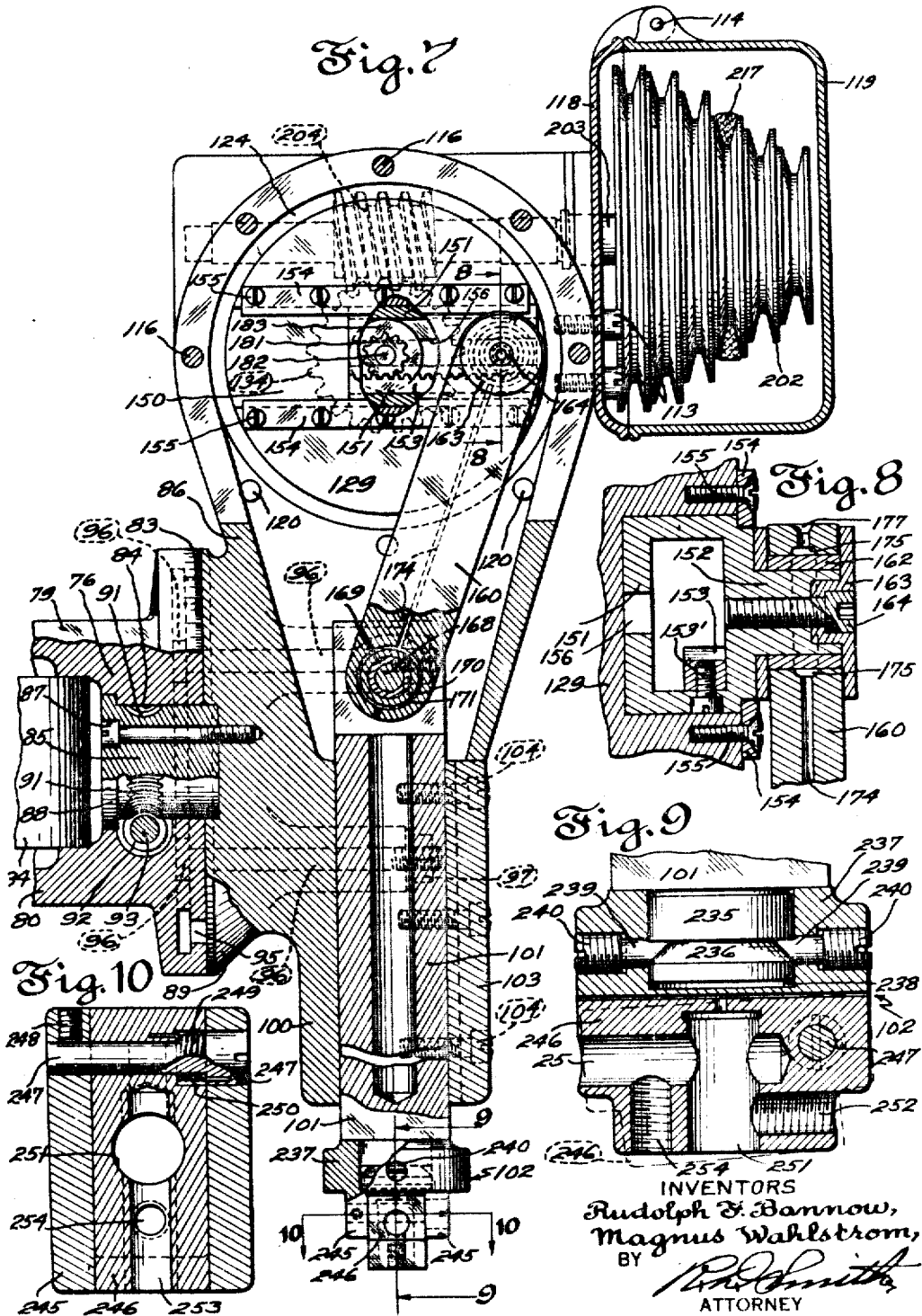

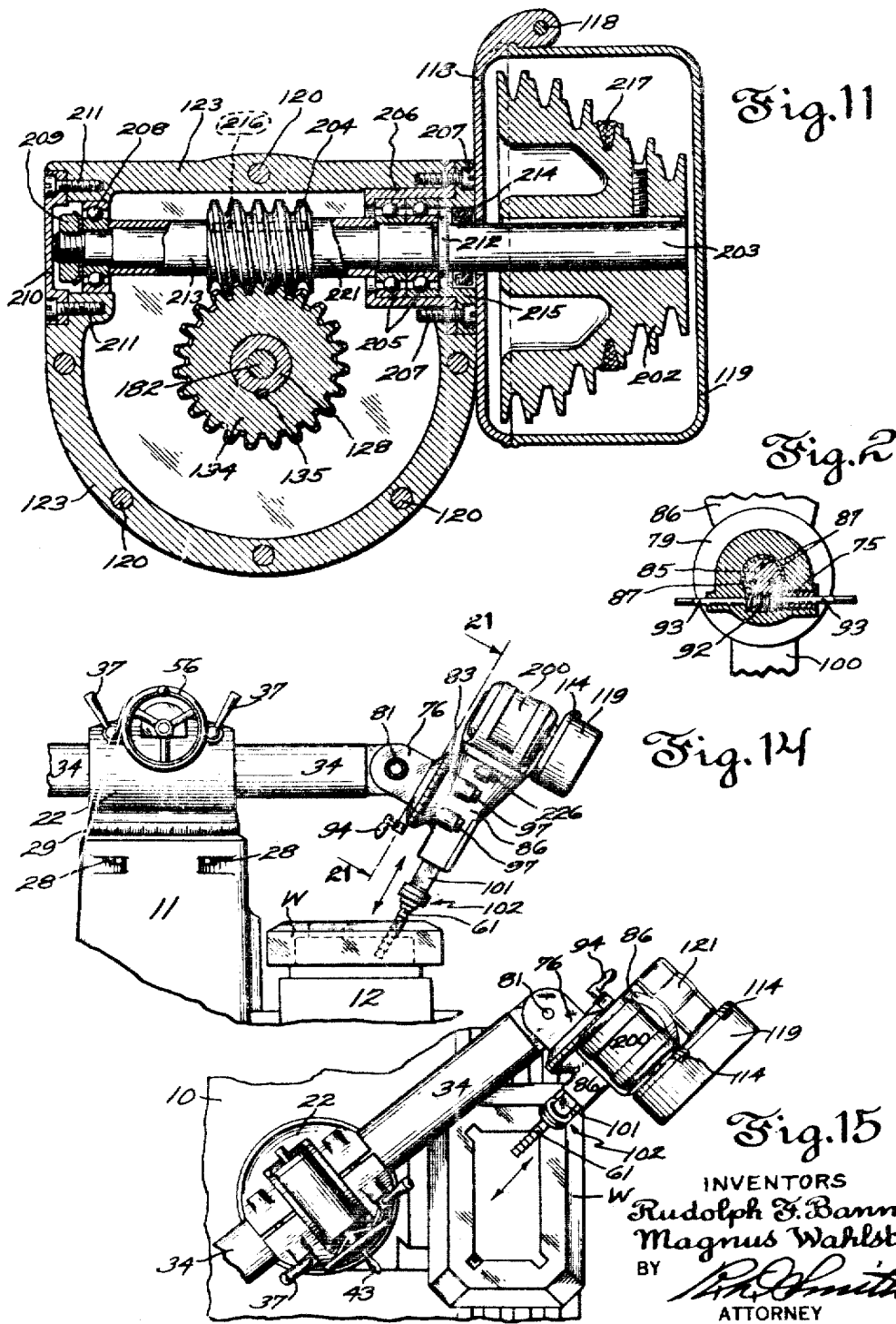

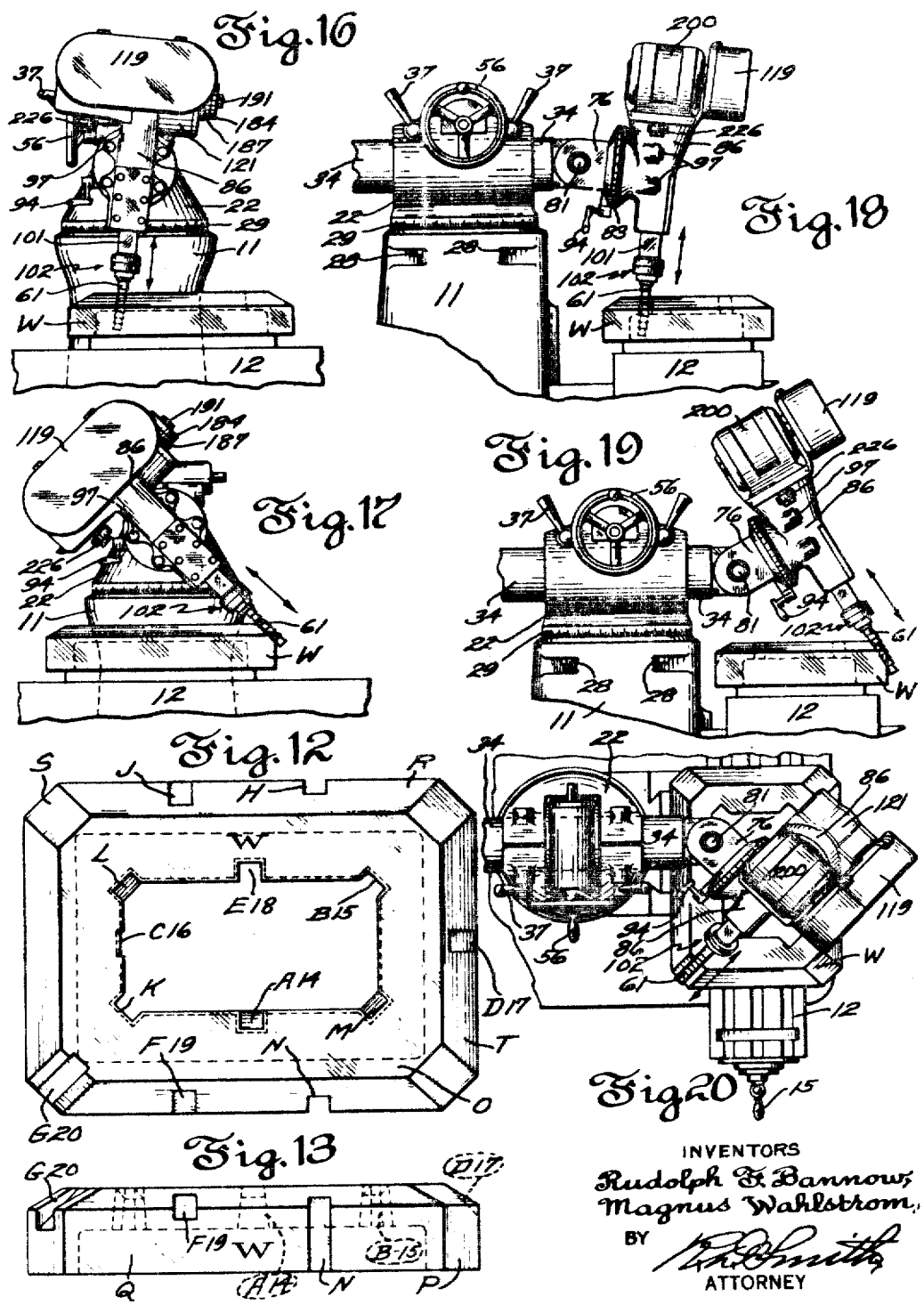

2,551,359

UNITED STATES PATENT OFFICE 2,551,359

SLOTTING MACHINE OPERATING AT UNIVERSAL ANGLES IN OVERALL LOCATIONS

Rudolph F. Bannow, Easton, and Magnus Wahlstrom, Bridgeport, Conn.

Application February 4, 1943, Serial No. 474,650

10 Claims. (Cl. 90—44)

This invention relates to machine tools of the general type adapted to perform rectilinear cutting, slotting, broaching and like machining operations by successive endwise reciprocative strokes of an appropriate powered tool such as a broach, and to machines adapted also to feed or adjust as well as to hold the work relative to the stroking path of the reciprocative tool. The present improvements particularly concern an attachment for performing the above described work which can be mounted detachably on the frame standard of a milling machine such as usually incorporates a work holding table movably mounted for feeding work carried thereby selectively in any of three different paths of movement with respect to the machine standard.

The invention as illustrated herein also resides in the slotting attachment, per se, including its reciprocative tool, as a unit that may be used instead of or in conjunction with a milling attachment having a rotary power tool as disclosed in a U. S. Patent No. 2,275,291, granted March 3, 1942, to Rudolph F. Bannow.

One object of the present improvements is to provide means for so adjustably supporting and positioning a self powered work machining unit including an elongated reciprocative shaping slotting or broaching tool, that such tool may perform rectilinear endwise cutting strokes on extreme end portions of a long piece of work when the work support table is positioned centrally of its range of horizontal lengthwise feeding travel from side to side of the standard. This makes it unnecessary to shift a long heavy piece of work on the table or hold it in a position of unbalance with most of its weight falling to one side of the underlying means of support for the work table.

Another object of the invention is to provide joints so arranged between different sections of an articulated support structure for a slotting or broaching attachment that its longitudinally reciprocative tool may be held and guided to perform stroking movements against the work in directions having any desired angular inclination in any of many different positions relative to the work, including those above mentioned, thus giving to the slotting attachment ability to perform its slotting, broaching or other reciprocative cutting operations in universal directions at universal positions free from restrictions and limitations as to direction and position that have heretofore handicapped use of a conventional machine tool, such for instance, as a shaper or planer.

A related object is to make it unnecessary to shift the position of the work on the work table to enable the tool to perform rectilinear machining strokes at many different angles of inclination in widely spaced regions of the work.

A still further object is to produce a simplified and compact form of self-powered slotting machine sufficiently light in weight to be handled conveniently and mounted as a unit on the overarm of a milling machine and removed therefrom at will.

A further object is to provide an improved, compact and simplified variable speed power drive for the reciprocative cutting tool of such an attachable slotting unit.

A still further object is to provide a readily varied length of stroke for the reciprocative cutting tool of such a slotting attachment.

The foregoing and other purposes of these improvements will be understood in greater detail from the following description of a preferred and illustrative embodiment of the invention, in which description reference is had to the accompanying drawings, wherein:

Figs. 1 and 2 are respectively a plan view and a front view of a complete machine tool including a slotting attachment embodying the present improvements.

Fig. 2a is a fragmentary view taken in section on the plane 2a—2a in Fig. 3.

Fig. 3 is a view of the complete machine tool in side elevation.

Fig. 4 is a plan view of the change-speed pulleys with their casing shown in section on the plane 4—4 in Fig. 2.

Fig. 5 is an enlarged rear view showing the parts of the slotting attachment partially in section on the plane 5—5 in Fig. 1, the tool holder shank being contracted in length.

Fig. 5a is a view taken in section on the plane 5—5 in Fig. 5 looking in the direction of the arrows.

Fig. 5b is a fragmentary view on a reduced scale taken in section on the plane 5b—5b in Fig. 5.

Fig. 6 is a view taken in section on the plane 6—6 in Fig. 5 looking downward.

Fig. 7 is a view on the same scale as Fig. 5 taken partly in section on the plane 7—7 in the latter figure looking in the direction of the arrows.

Fig. 8 is a still further enlarged fragmentary view taken in section on the plane 8—8 in Fig. 7 looking in the direction of the arrows.

Fig. 9 is a view taken in section on the vertical plane 9—9 in Fig. 7 drawn on a further enlarged scale.

Fig. 10 is a view taken in section through the tool holder on the horizontal plane 10—10 in Fig. 7 drawn on the same enlarged scale as Fig. 9.

Fig. 11 is a view drawn on the same scale as Fig. 7 taken in section on the plane 11—11 in Fig. 5 looking in the direction of the arrows.

Fig. 12 is a plan view of a typical work piece showing various surfaces that may be cut by a slotting attachment supported and operating according to this invention.

Fig. 13 is an edgewise view looking at Fig. 12.

Figs. 14 to 20, inclusive, are views described in greater particular hereinafter showing my improved slotting attachment adjusted to different positions with respect to the milling machine standard and with respect to the work for making various cuts on the work piece shown in Figs. 12 and 13.

Fig. 21 is a fragmentary view taken in section on the plane 21—21 in Fig. 14 looking in the direction of the arrows.

Conventional parts of a horizontal milling machine as appearing in Figs. 1, 2 and 3, include a base 10, a frame standard 11, and a work table 12. This table may be shifted to and held in various vertical positions by usual screw means operated by the handle 13 and may also be shifted backward and forward, toward and away from, the frame standard in Fig. 2 by screw means operated by the handle 14, and may also be shifted from side to side of the frame standard in Fig. 2 by screw means operated by either of the handles 15. The above mentioned and other table holding and operating parts of the machine as shown in the drawings may be conventional and do not require explanation. Handles 17, 18 and 19 operate wedge clamps to lock the knee 20 against vertical movement, the cross slide 21 against movement relative to the knee and table 12 against movement relative to the cross slide, respectively.

For holding the turret head 22 securely in each of the unlimited number of positions to which it may be turned on the frame standard, bolts 27 are employed secured by nuts 28 in the niches 16 by means of construction not shown herein but fully disclosed in the U. S. Patent No. 2,275,291. Angular movement and positions of the turret head 22 may be accurately measured and known by the scale of graduations 29 about the bottom rim of the turret head (Figs. 2 and 3). The frame standard may carry a "zero" or index mark to register with graduations 29.

Turret head 22 of Figs. 1, 2 and 3 is hollow and provides rotary and slide bearings for a sturdy elongated cylindrical overarm 34 which so support this arm that the latter may rotate through 360 angular degrees of turning in said bearings as well as slide lengthwise therein. The internal cooperative structure of turret 22 and overarm 34 may be as is more fully disclosed in the aforesaid Patent No. 2,275,291 so that only the exterior manual operating parts require description here. The crown wall 35 is slotted in a vertical plane centrally and lengthwise of the overarm 34 to provide a split enabling the side halves of the crown wall to be sprung together to clamp the overarm 34 and hold it immovable in the turret head. For contracting the split portion of the crown wall, draw bolts 36 having handles 37 pass through clearance holes in one side of the split crown wall and have threaded engagement with lugs 38, respectively, on the other side of the split in the crown wall.

The turret head 22 is provided with a cap member 39 removably fastened thereto by holding screws 41 which affords bearings for a shaft 43 extending crosswise of overarm 34 to which is keyed the worm 44 (Fig. 3) in mesh with a worm wheel 50 which surrounds and is slidably splined to the overarm by means of a key 51. Suitable thrust bearings (not shown herein) for both the worm and worm wheel drive may be constructed as in the aforesaid patent. Worm 44 is thus capable of rotating overarm 34 about the latter's axis any desired number of degrees which may be measured or determined accurately by a series of graduations 54 on the outside of the turret head in register with the periphery of the overarm. The latter may have a longitudinal index line to register with said graduations extending, if desired, the entire length of the overarm. In every rotary position of overarm 34, this arm is free to be shifted lengthwise of the turret head to any desired extent when the draw bolts 36 are loosened. For this purpose shaft 43 carries fixedly on its end the hand wheel 56, turning of which shifts the rotary position of the overarm. Thus hand wheel 56 by rotating the overarm serves to shift the angle of inclination of reciprocative cutter 61, hereinafter referred to. Thus the latter can perform its machining strokes on a work piece at various angles radial to the overarm axis.

The work machining unit or attachment, which according to the present improvements is supported entirely by the overarm 34, is attached thereto by means of an articulated supporting structure including a yoke member 76 pivotally adjustable about a hinge bolt 81. This hinge bolt passes through a clearance hole or holes in the flatted terminal portion of the overarm, which may be hollow, and has threaded engagement with the yoke flange 80, all of which construction may be as fully disclosed in the aforesaid patent. The yoke 76 may swing somewhat more than 180 degrees relatively to the flatted terminal of the overarm and carries graduations 74 marked on the curved edge of upper yoke flange 79 which may register with an index mark at any suitable point on the overarm surface for measuring and determining degrees of angular inclination of the yoke relative to the overarm.

Yoke 76 has its extreme right marginal end formed with an exterior cylindrical periphery marked with graduations 83. At this same end the yoke member terminates in a flat face through which opens a central bore or bearing hole 84. In this bore is journaled a trunnion 85 which is fixedly seated in a circular recess in the mating flat face of a rearward directed mounted flange 89 forming part of the crank case 86 of our improved slotting attachment. Yoke 76 is fixedly secured to this mounting flange by removable holding bolts 96. Trunnion 85 has a thrust-taking head of enlarged diameter rotatably fitting a counterbore at the left end of bearing hole 84. The journaled periphery of trunnion 85 is provided with worm-wheel threads 91 which are in mesh with a worm 92 fixed on a shaft 93 that is journaled in the structure of yoke 76 and carries externally of the latter a manually turnable handle 94 for turning shaft 93 and thereby swiveling the crank case bodily about the axis of trunnion 85. As best shown in Fig. 21, an externally threaded bearing bushing 75 is as large in overall diameter as is the worm 92 and is lodged in crank case 86 to afford one of the bearings for shaft 93. An index mark on the crank case may register with the beforesaid graduations 83 on yoke 76 to assist in measuring and determining the angular extent of swiveling movement of the crank case. For firmly holding such circular adjustment of the crank case as is attained by turning worm 92, an annular slot 95 of T-shape cross section is sunk in the aforesaid flat face of yoke 76 and accommodates the square heads of stay bolts 96 whose front threaded ends project forward through and out of lateral bosses on slide bearing 100 of the crank case to take the tightening nuts 97.

The crank case 86 is vertically elongated at its lower end to form with the assistance of cover plate 103 a tubular elongate extension of the crank case that serves as a plunger throat or slide bearing 100. This affords a vertical channel occupied and slidably fitted by the lengthwise reciprocative shank or slide 101 which carries at its bottom end the composite tool holder 102. The channel in slide bearing 100 is completed at the front by a removable cover plate 103 detachably secured to the crank case 86 by bolts 104 as best shown in Figs. 2, 6 and 7. Mounting flange 89 thus flanks this elongate tubular extension and its trunnion 85 projects outward therefrom in crosswise relation thereto and in laterally centralized relation to tool operating slide 101.

Undesirable looseness in the sliding fit of shank 101 in its slide bearing 100 may be compensated for by moving longitudinally upward the tapered gib 105 which for this purpose is provided with an outwardly facing notch 106 engaged by shoulder 107 of the adjusting screw 108 having threaded engagement with the crank case 86. An adjustment holding screw 109 has threaded engagement with the gib 105 and is slidable in a vertically elongated slot 110 in the wall of the crank case and has its head exposed to permit it to be tightened or loosened, said screw head occupying the vertically elongated counterbore 111 of slot 110 as shown in Figs. 5 and 6.

The top end of crank case 86 forms a narrow, hollow, partially cylindrical head, on the left side of which in Fig. 2 is fixedly mounted by means of screws 115 a power frame indicated as a whole by 116 and consisting of a bracket-like motor supporting platform 117 integral with the housing back panel 118 forming part of a closure for a pair of speed change pulleys hereinafter referred to. The pulley housing is completed by a box-like cover 119 hinged at 114 to back panel 118 so as to swing forward and upward for exposing the pulleys. If preferred, back panel 118 may be formed as a separate part attached to the crank case 86 by screws 113 shown in Fig. 7.

Secured to the left side of crank case 86 in Fig. 5 by bolts 120 is a composite, generally cylindrical transmission case 121 consisting of a partitioned section 122 closed by the end cap section 123. Section 122 incorporates a partition wall 124 centrally bored to receive the outer race 125 of a roller bearing 126 retained by screws 136 and whose inner race 127 is fast on the trunnion or hollow stub shaft 128 of the crank disc 129. The end cap section 123 of transmission case 121 is bored coaxially with partition wall 124 to receive the outer race 130 of a ball bearing 131 whose inner race 132 fits crank hub 128 whereby an effective length of sturdy antifrictional bearing support is afforded to crank disc 129. The axial space between inner race 127 and inner race 122 on crank hub or trunnion 128 is filled by a spacer washer 123 and the worm wheel 134 which is splined to crank trunnion 128 by means of key 135. This worm wheel, spacer collar and both inner races of the ball bearings are retained axially by the nut 136 having threaded engagement with the crank hub.

Ball bearing 131 is of the axial, thrust affording type so that all end thrust of the crank toward the right in Fig. 5 is borne by the annular shoulder 140 on the end cap section 123 against which seat the outer race 130 of ball bearing 131 is fixedly retained by a removable thrust plate 141 detachably secured to and cap section 123 by the holding screws 142. Any suitable type of oil seal 143 may be lodged in a recess in thrust plate 141 to bear against the crank trunnion 128. A similar oil seal 144 may be lodged in an annular recess in the rear face of crank disc 129 to wipe sweepingly about a projecting annular rim surrounding the bearing bore in partition wall 124. These oil seals preclude entrance of dirt to bearing 126 and 131 and prevent outward escape of lubricant from the interior of transmission case 121.

Sunk in the front face of crank disc 129 is a diametrically extending channel 150 occupied and slidably fitted by an adjustable crank arm 151 which in the form proposed herein constitutes a hollow open-ended bar of rectangular cross section having an elongated slot or gap 156 in its rear wall and further as best shown in Figs. 7 and 8 having integral therewith a projecting stud or crank pin 152. Crank arm 151 is equipped in its hollow interior with a gear-toothed rack 153 made fast to crank arm 151 by holding screws 153'. Crank arm 151 is slidably held in crank disc 129 by retaining strips 154 which overhang each edge of the channel opening and are removably fastened and held in place by screws 155 having threaded engagement with the crank disc.

Crank pin 152 is impellingly coupled to a lengthwise reciprocative plunger or tool holder shank 101 by pitman link 160 which comprises a rigid bar having its top end bored to engage pivotally with crank pin 152 and retained thereon as best shown in Fig. 9 by means of a thrust washer 161, a bearing collar 162 and a retaining washer 163. The latter is cupped to seat in a recess in the front end of crank pin 152 and receives the flush head of a cup-headed retaining screw 164 having threaded engagement with crank pin 152. The lower end of pitman link 160 is bored to provide pivotal engagement with a wrist-pin bolt 168 carried crosswise of the top, forked end of shank 101 whereby this slide 101 is hinged to the pitman link. This construction appears in Figs. 5 and 7 wherein is shown a long bearing collar 169 and a short bearing collar 170 flanked at its ends by thrust washers 171. Wrist-pin bolt 168 has threaded engagement with a nut 172 lodged in shank 101 and which is shown to be lockable in relation to bolt 168 by a set screw 173. Pitman link 160 may be centrally drilled throughout its length to provide a duct 174 for lubricating oil. This duct terminates at its ends in an annular oil groove 175 bordering around the bearing collar 162 and in a similar annular oil groove 176 bordering around the bearing collar 170. Oil may be fed first to the annular groove 175 and thence downward through duct 174 to oil groove 176 by hand oiling through the oil receiving orifice 177 when crank pin 152 is in suitable position for this orifice to be reached by an oil can spout inserted through any correspondingly positioned opening in the wall of the crank case head. Also the oil receiving orifice 177 may have lubricant automatically wiped into its mouth by means of an oil feeding wick stationed inside of the crank case head in position to be wiped by the oil orifice 177 at each revolution of crank pin 152 as is common practice in the art of lubrication.

The distance from the axis of rotation of crank disc 129 to the center of crank pin 152 may be termed the crank radius. Multiplied by two, this distance constitutes the total crank stroke which is translated to the tool holder 102 through pitman link 160, and which crank stroke determines the linear distance of reciprocative travel of the cutting tool 61. This tool is shown in Figs. 14 to 20 as a broach, but may take the form of many other well known kinds of cutting tools sharpened to give cutting clearance when moved against the work in a straight path of travel. According to the present invention the length of stroke of the crank which determines the distance of tool travel is adjustable at a point entirely outside of crank case 86 and outside of transmission case 121. Our improved construction for accomplishing this is most clearly shown in Figs. 5 and 7 wherein a small spur gear 181 in mesh with rack 153 is fixedly carried on the front end of a crank stroke adjusting shaft 182 that is journaled in and extends concentrically through an axial central bore or bearing hole in hollow crank hub 128 to the exterior of crank case 86 where it is manually accessible for adjustment. Shaft 182 has an enlarged shoulder 183 flanking gear 181 and separating the latter from one wall of the hollow crank arm 151. The slot-like break or gap 156 in the rear wall of hollow crank arm 151 through which shaft 182 in Fig. 5 is shown to extend permits adjustable sliding movement of crank arm 151 relative to the latter crank disc. It will be noted that pinion 181, collar 183, or shaft 182 are all outside of the path in which the crank arm or slide 151 moves.

At the opposite extreme end of the crank pin adjusting shaft 182 a graduated drum or adjustment measuring wheel 184 is carried in axially slidable relation to this shaft but is fixed in rotative relation thereto by the spline or key 185. Drum 184 carries adjustment measuring indicia 187 which register with an index mark on the periphery of a clutch disc 187 fixed in rotative relation to crank trunnion 128 by key 188. One or more plugs or clutch pins 189 are fixedly imbedded in the measuring drum 184 and project into locking engagement with selective sockets or clutch holes 190 in another adjustment measuring wheel or clutch disc 187 when adjusting drum 184 occupies its position on shaft 182 shown in Fig. 5. This position is maintained by a nut 191 having threaded engagement with the end of shaft 182 and separated from the drum by a slidable thrust washer 192.

When nut 191 is backed off toward the left in Fig. 5 on shaft 182 the coiled spring 193, which is under axial compression between drum 184 and clutch 187, separates the latter two parts axially, clutch pin 189 being freely slidable axially in the holes 190. When pin 189 is clear of holes 190 the periphery of drum 184, which may be knurled as shown at 194, can be grasped and turned for rotating shaft 182 and thereby the gear 181. This gear then acts on rack 153 to slide crank arm 151 lengthwise of its diametrical channel 150 in crank disc 129 and thus varies the radial distance from the axis of crank rotation to the center of crank pin 152 any selective amount which is measured by the indicia 186 on drum 184. When the desired effective length of crank arm is thus obtained, the drum 184 will be forced manually toward clutch disc 187 until clutch pin 189 enters the appropriate hole 190 for locking drum 184 and clutch disc 187 rotatively together. Nut 191 is then set up to retain these parts in their positions shown in Fig. 5 which maintains a fixed length of crank arm and thereby a fixed distance of tool stroke until the crank arm length is again to be readjusted. A cover shell 195 is removably held on the periphery of thrust plate 141 by means of bayonet engagement of its rim edge with one or more pins 196 radially projecting from the periphery of thrust plate 141.

Rotary power is imparted to crank disc from motor 200 through two step pulleys 210 and 202 and belt 217 and the latter of these pulleys, as most clearly shown in Fig. 11, is keyed or made fast to a shaft 203 which carries the drive worm 204 keyed thereto at 216 and meshing with worm wheel 134. Shaft 203 is journaled in radial and thrust type ball bearings 205 whose outer races are lodged fixedly in a bearing cup 206 removably seated in an aperture in the front wall of partition section 122 of the transmission case 121 by means of screws 207 which also hold in place the race retaining end ring 215. The rear end of worm shaft 203 is journaled in a ball bearing 208 whose inner race is retained by a thrust nut 209 having threaded engagement with the shaft. The inner races of ball bearings 205, collars 213, 221, and worm 204 are all thrust axially and tightly together toward shoulder 212 on shaft 203 by nut 209. A protective cap 210 retained by screws 211 serves as cover for the aperture containing ball bearing 208 in the rear wall of transmission case 121. Lubrication is prevented from escaping from the interior of transmission case 121 into the pulley housing 118, 119 by means of any appropriate oil seal 214 lodged in end ring 215.

The stepped pulley 202 on worm shaft 203 is driven by a shiftable belt 217 from the stepped pulley 210 which is fast on the shaft 218 of power motor 200. This motor is external to all of the housing interiors hereinbefore mentioned and its base 220 is slidable between left and right in Fig. 5 for tightening and loosening belt 217. The belt tightener construction includes a slotted sub-base 220 fast to motor legs 219 which consists of a plate whose edges are slidably supported on guideways 222 formed on the top surface of motor platform 117. The sub-base plate 220 contains an elongated recess 230 fitted with a gear toothed rack 223 fixed therein with which a gear 224 fast on shaft 225 meshes. The floor 229 of recess 230 is slotted at 231 longitudinally of recess 230 to permit the top end of a vertical shaft 225 to pass therethrough. This shaft is journaled in bracket 117 and carries slidably thereon beneath bracket 117 a knurled wheel handle 226 keyed to shaft 225 at 227. A lock nut 228 has threaded engagement with the threaded bottom end of shaft 225 so that when this nut is loosened shaft 225 can be rotated by means of handle 226 whereupon gear 224 will turn and impel rack 223 to slide with sub base 220 toward the right or left in Fig. 5 loosening or tightening belt 217. Belt tightening adjustment is maintained by setting up the nut 228 by means of a wrench so that it will clamp the hub or wheel handle 226 upward against the bottom surface of motor platform 117 and thus draw gear 224 downward against the floor wall 229 of the subbase clamping the latter fixedly against its ways 222.

Details of the composite tool holder are shown most clearly in Figs. 7, 9 and 10, wherein the shank 101 is seen to have a bottom terminal stud 235 of reduced diameter in which is cut an annular tapered groove 236. The body 237 of the tool holder has a socket 238 fitting the shank terminal 235 and which is made fast thereto in variable rotative positions by means of two slidable plugs 239 whose beveled inner ends seat in the groove 236 in a manner to wedge body 237 forcibly upward against the shoulder on shank 101 when set screws 240 which back up plugs 239 are tightened in their threaded holes in the tool holder body. Loosening these set screws permits the wedging plugs 239 to lose their grip on shank terminal 235 so that the tool holder body 237 can be turned adjustably to any rotary position relative to the shank 101.

Hinged between two lugs 245 forming part of tool holder body 237 there is a tool mounting gate block 246 which has limited swinging movement about the hinge pin 247 so that when the cutting tool 61 is receding idly from its working stroke it may be relieved from binding against the work. Referring to Fig. 9, this gate block can swing downward only to its position indicated in broken lines in which position its movement is limited by contacting of the extreme upper right edge of the tool handling block 246 with the tool holder body 237 as the former swings downward about hinge pin 247. This hinge pin is held fast in the tool holder body by set screw 248 as shown in Fig. 10, but tool holding block 246, itself, will be maintained normally in its full line or uppermost position in Fig. 9 by the action of a coil spring 249 around pin 247 in a recess 250 counterbored in the tool holding block under the head of hinge pin 247. One end of spring 249 is anchored in the stationary head of the hinge pin while the other end impelling engages the swingable tool holding block 246 urging the latter to its normal position shown in full lines in Fig. 9.

In the form shown, a vertical socket 251 opens outward at the bottom of the tool holding block to receive the tool, such as the broach 61 appearing in Figs. 14 to 20. The mounted end of the tool may be secured firmly by a set screw (not shown) that may occupy threaded hole 252. Tool holding block 237 also has a laterally bored socket 253 which intercepts the vertical socket 251 and is suited to holding any kind of cutting tool desired to project from the tool holder in lateral relation to the path of its cutting stroke rather than longitudinally of such path. Another threaded hole 254 will accommodate a set screw (not shown) for firmly securing a laterally projecting cutting tool in socket 253.

In explaining the more advantageous operation of our improved form of self powered slotting attachment, attention is first called to Figs. 12 and 13 in which is represented a slab-like work piece W having various rectilinear cuts made therein at widely varying angles and in differing locations as is possible to a slotting attachment constructed according to this invention. These machined surfaces are referred to by reference characters consisting of a reference letter identifying the slot together with a numeral corresponding to that numbered figure of the drawings which shows an appropriate adjustment of our improved slotting attachment for machining the letter-designated cut. Work piece W may be stayed in relation to table 12 in any conventional way as by bolts and clamp straps not here necessary to illustrate or explain. In the understanding of the use of reference characters explained and assuming a conventional set-up of the work piece W on the work supporting table 12, the slotting attachment adjustment shown in Fig. 14 will for example produce the cut designated A14 in Figs. 12 and 13. Without change of position of work piece W on table 12, the set-up illustrated in Fig. 15 will produce the cut designated B15 in Figs. 12 and 13. Without change of position of work piece W on table 12, the set-up illustrated in Fig. 17 will produce the cut D17. Without change of position of work piece W on table 12, the set-up in Fig. 18 will produce cut E18. Likewise the set-up shown in Fig. 19 will produce the cut F19 and the set-up shown in Fig. 20 will produce the cut G20. From the adjustments and the resulting cuts here illustrated it will be seen that vertical cuts such as H or variously inclined cuts such as J, K, L, M, and N can also be produced at will by merely readjusting the various sections of the articulated support means for our improved slotting unit. By feeding the work table as the cutting tool reciprocates, any desired extended surfaces, such as the horizontal surface O or the vertical surface P and Q or the inclined surface R, S and T, may be generated quickly, conveniently and accurately. It is particularly to be noted that any and all of these cuts are but examples of an unlimited variety of other straight line cuts that may be made in any region of the work at any desired direction of tool stroke without requiring the work to be removed from the work table after it is once fastened thereon. Therefor all dimensions of the various cuts as well as the distances therebetween and the angular relations thereof may be determined accurately and solely by a setting of the parts supporting our improved slotting attachment measurable by the graduations or measuring indicia marked thereon, and without resorting to direct measurements of the work or of the position in which it is held.

With reference to Fig. 3 herein it is proposed that the left end of overarm 34 which is slabbed and bored to accommodate a hinge bolt like 81 may carry the milling attachment unit with rotary power driven tool indicated by reference numerals 60 to 83 in Fig. 3 of the issued Patent 2,275,291 exactly as therein disclosed. In such case swinging the turret 22 a half turn enables either the power rotated tool of the said issued patent or the power reciprocated tool hereof to act successively on the same work piece W without disturbing its set-up on work table 12. This is in line with major objectives of these improvements which aim at leaving the work in fixed position when once placed, if desired, and accomplishing all machining of the fixed positioned work piece by simply placing and adjusting the attachment for making the various cuts upon the work.

Reviewing in general the hereinbefore mentioned features of operation, any piece of work W that is to be machined will first be clamped on work table 12 after which this work supporting table with its carried work can be shifted in any one or all of three different directions by means of handles 13, 14 and 15 and locked in fixed position by handles 17, 18 or 19. A suitable tool 61 is then placed in the tool holder 102 and the slotting attachment is bodily placed in appropriate position with respect to the region of the work to be operated upon by turning the turret 22 about its vertical axis, and/or sliding overarm 34 longitudinally in turret 22. After this bodily placement of the whole slotting attachment with respect to the work, the direction or angle of stroke of the power reciprocated cutting tool 61 is established by turning overarm 34 about this longitudinal axis to any degree made known by indicia 54, and/or swinging yoke 79 to any position about hinge bolt 81 through angles measurable by indicia 74, and/or by swiveling crank case 76 bodily through any number of degrees measurable by indicia 83, as for instance from its position in Fig. 16 to its position in Fig. 17. The adjustment of turret 22 on the standard 11 is held by nuts 28, of the overarm 34 in the turret 22 by clamp handles 37, of the yoke 79 relative to the overarm 34 by tightening and loosening hinge bolt 81, and of crank case 86 relative to yoke 79 by means of nuts 97. The unlimited number of positions in which the attachment may bodily be placed, and the different directions in which the working stroke of the tool may be inclined, will be understood from the examples appearing in Figs. 14 to 20. It will further be understood from these illustrations that there is no angle and no placement of the work tool which can not be attained by some one or all of the various adjustments herein illustrated and described.

The following claims are therefore not intended to limit the coverage of this patent beyond the inclusion within their terms of all fair equivalents for the structures, arrangements, and modes of operation referred to in the claims.

We claim:

1. A self powered bodily adjustable work machining attachment, including the combination of, a motor powered crank for driving a work machining tool, a case arranged to house said crank having an elongate tubular extension, mounting structure flanking said extension for adjustably supporting said case in bodily shiftable positions, a pitman link occupying said extension pivotally connected to said crank, and a tool operating slide in part occupying said tubular extension having a tool carrying end accessible from the exterior thereof and having its opposite end hinged to said pitman link at a location within said extension between said tool carrying end and said crank.

2. A self powered bodily adjustable work machining attachment, including the combination of, a motor powered crank including a crank pin for driving a work machining tool shiftable in radial relation to the crank axis, a case arranged to house said crank having an elongate tubular extension, mounting structure flanking said extension constructed and arranged adjustably to support said case in bodily shiftable positions, a pitman link occupying said extension pivotally connected to said crank pin, a tool operating slide in part occupying said tubular extension having a tool carrying end accessible from the exterior thereof and having its opposite end hinged to said pitman link at a location within said extension between said tool carrying end and said crank pin, and mechanism constructed and arranged to shift said crank pin in radial relation to the crank axis including a crank pin adjusting shaft coaxial with said crank adjustably turnable relatively thereto and extending outside of the crank case thereby to be manually accessible for adjustment.

3. A self powered bodily adjustable work machining attachment, including the combination of, a motor powered crank having a hub containing an axial central bearing hole and including a crank pin for driving a work machining tool shiftable in radial relation to the crank axis, a case arranged to house said crank out of which case said crank hub extends, said case having an elongate tubular extension, mounting structure flanking said extension constructed and arranged adjustably to support said case in bodily shiftable positions, a pitman link occupying said extension pivotally connected to said crank pin, a tool operating slide at least in part occupying said tubular extension having a tool carrying end accessible from the exterior of said case extension and having its opposite end hinged to said pitman link at a location within said extension between said tool carrying end and said crank pin, mechanism constructed and arranged to shift said crank pin radially in relation to the crank axis including a crank pin adjusting shaft journaled in said bearing hole of the crank and extending outside of said crank case thereby to be manually accessible for rotary adjustment, an adjustment measuring wheel rotatably fixed on said shaft, a cooperative adjustment measuring wheel fixed on said crank hub, and fastening means manually operable outside said crank case settable in a manner to lock said wheels together in selective rotary relationship.

4. A self powered bodily adjustable work machining attachment, including the combination of, a motor powered crank for driving a work machining tool, a case arranged to house said crank having an elongate tubular extension, a pitman link occupying said extension pivotally connected to said crank, a tool operating slide in part occupying said tubular extension having a tool carrying end accessible from the exterior thereof and having its opposite end hinged to said pitman link at a location within said extension between said tool carrying end and said crank, and mounting structure flanking said extension for adjustably supporting said case in bodily shiftable positions including a trunnion fixed on and projecting outward from said tubular crank case extension in crosswise relation thereto and in laterally centralized relation to said tool operating slide.

5. A self powered bodily adjustable work machining attachment, including the combination of, a motor powered crank including a crank pin for driving a work machining tool shiftable in radial relation to the crank axis, a case arranged to house said crank having an elongate tubular extension, mounting structure flanking said extension constructed and arranged adjustably to support said case in bodily shiftable positions, a pitman link occupying said extension pivotally connected to said crank pin, a tool operating slide in part occupying said tubular extension having a tool carrying end accessible from the exterior thereof and having its opposite end hinged to said pitman link at a location within said extension between said tool carrying end and said crank pin, mechanism constructed and arranged to shift said crank pin in radial relation to the crank axis including a crank pin adjusting shaft coaxial with said crank adjustably turnable relatively thereto and extending outside of the crank case thereby to be manually accessible for adjustment, and selectively settable instrumentalities constructed and arranged to stay said shaft in fixed relation to said crank in a variety of crank pin adjusting positions.

6. A self powered bodily adjustable work machining attachment, including the combination of, a motor powered crank having a hub containing an axial central bearing hole and including a crank pin for driving a work machining tool shiftable in radial relation to the crank axis, a case arranged to house said crank out of which case said crank hub extends, said case having an elongate tubular extension, mounting structure flanking said extension constructed and arranged adjustably to support said case in bodily shiftable positions, a pitman link occupying said extension pivotally connected to said crank pin, a tool operating slide at least in part occupying said tubular extension having a tool carrying end accessible from the interior of said case extension and having its opposite end hinged to said pitman link at a location within said extension between said tool carrying end and said crank pin, mechanism constructed and arranged to shift said crank pin radially in relation to the crank axis including a crank pin adjusting shaft journaled in said bearing hole of the crank and extending outside of said crank case thereby to be manually accessible for rotary adjustment, an adjustment measuring wheel rotatably fixed on said shaft, a cooperative adjustment measuring wheel fixed on said crank hub, fastening means manually operable outside said crank case settable in a manner to lock said wheels together in selective rotary relationship, a driven gear wheel fixed on said crank hub between the said crank pin and said measuring wheels, and a driving gear wheel in mesh with said driven gear wheel journaled in said crank case.

7. A self powered bodily adjustable work machining attachment, including the combination of, a motor powered crank having a hub containing an axial central bearing hole and including a crank pin for driving a work machining tool shiftable in radial relation to the crank axis, a case arranged to house said crank out of which case said crank hub extends, said case having an elongate tubular extension, mounting structure flanking said extension constructed and arranged adjustably to support said case in bodily shiftable positions, a pitman link occupying said extension pivotally connected to said crank pin, a tool operating slide at least in part occupying said tubular extension having a tool carrying end accessible from the exterior of said case extension and having its opposite end hinged to said pitman link at a location within said extension between said tool carrying end and said crank pin, mechanism constructed and arranged to shift said crank pin radially in relation to the crank axis including a crank pin adjusting shaft journaled in said bearing hole of the crank and extending outside of said crank case thereby to be manually accessible for rotary adjustment, an adjustment measuring wheel slidably splined to said shaft, a cooperative adjustment measuring wheel fixed on said crank hub, and fastening means manually operable outside said crank case settable in a manner to lock said wheels together in selective rotary relationship.

8. A self powered bodily adjustable work machining attachment, including the combination of, a motor powered crank having a hub containing an axial central bearing hole and including a crank pin for driving a work machining tool shiftable in radial relation to the crank axis, a case arranged to house said crank out of which case said crank hub extends, said case having an elongate tubular extension, mounting structure flanking said extension constructed and arranged adjustably to support said case in bodily shiftable positions, a pitman link occupying said extension pivotally connected to said crank pin, a tool operating slide at least in part occupying said tubular extension having a tool carrying end accessible from the exterior of said case extension and having its opposite end hinged to said pitman link at a location within said extension between said tool carrying end and said crank pin, mechanism constructed and arranged to shift said crank pin radially in relation to the crank axis including a crank pin adjusting shaft journaled in said bearing hole of the crank and extending outside of said crank case thereby to be manually accessible for rotary adjustment, an adjustment measuring wheel rotatably fixed on said shaft, a cooperative adjustment measuring wheel fixed on said crank hub, and fastening means manually operable outside said crank case settable in a manner to lock said wheels together in selective rotary relationship comprising a plug in one of said measuring wheels variously entering sockets in the other of said measuring wheels.

9. A self powered bodily adjustable work machining attachment, including the combination of, a motor powered crank having a hub containing an axial central bearing hole and including a crank pin for driving a work machining tool shiftable in radial relation to the crank axis, a case arranged to house said crank out of which case said crank hub extends, said case having an elongate tubular extension, mounting structure flanking said extension constructed and arranged adjustably to support said case in bodily shiftable positions, a pitman link occupying said extension pivotally connected to said crank pin, a tool operating slide at least in part occupying said tubular extension having a tool carrying end accessible from the exterior of said case extension and having its opposite end hinged to said pitman link at a location within said extension between said tool carrying end and said crank pin, mechanism constructed and arranged to shift said crank pin radially in relation to the crank axis including a crank pin adjusting shaft journaled in said bearing hole of the crank and extending outside of said crank case thereby to be manually accessible for rotary adjustment, an adjustment measuring wheel slidably splined to said shaft, a cooperative adjustment measuring wheel fixed on said crank hub, and fastening means manually operable outside said crank case settable in a manner to lock said wheels together in selective rotary relationship comprising a plug in one of said measuring wheels variously entering sockets in the other of said measuring wheels.

10. A self powered bodily adjustable work machining attachment, including the combination of, a motor powered crank including a crank pin for driving a work machining tool shiftable in radial relation to the crank axis, a case arranged to house said crank having an elongate tubular extension, mounting structure flanking said extension constructed and arranged adjustably to support said case in bodily shiftable positions, a pitman link occupying said extension pivotally connected to said crank pin, a tool operating slide in part occupying said tubular extension having a tool carrying end accessible from the exterior thereof and having its opposite end hinged to said pitman link at a location within said extension between said tool carrying end and said crank pin, and mechanism constructed and arranged to shift said crank pin in radial relation to the crank axis including a crank pin adjusting shaft coaxial with said crank adjustably turnable relatively thereto and extending outside of the crank case thereby to be manually accessible for adjustment and rack gear teeth in fixed relation to said crank pin and a gear in mesh therewith fixed on said adjusting shaft.

RUDOLPH F. BANNOW.
MAGNUS WAHLSTROM.

REFERENCES CITED

The following references are of record in the file of this patent:

UNITED STATES PATENTS

| Number | Name | Date |
|---|---|---|
| Re. 22,929 | Bannow | Oct. 21, 1947 |
| 360,530 | Kaufholz | Apr. 5, 1887 |
| 364,530 | Martin | June 7, 1887 |
| 403,453 | Belden | May 14, 1889 |
| 590,343 | Smith et al. | Sept. 21, 1897 |
| 678,341 | Holmberg | July 9, 1901 |
| 763,742 | Emerson | June 28, 1904 |
| 770,981 | Pfleghar | Sept. 27, 1904 |
| 846,728 | Cochrane et al. | Mar. 12, 1907 |
| 904,764 | Drecoll | Nov. 24, 1908 |
| 953,768 | Sutherland | Apr. 5, 1910 |
| 1,466,062 | Rhodes | Aug. 28, 1923 |
| 1,537,059 | Bausch | May 12, 1925 |
| 1,661,509 | Skinner | Mar. 6, 1928 |
| 2,105,237 | Welch | Jan. 11, 1938 |
| 2,275,291 | Bannow | Mar. 3, 1942 |
| 2,281,774 | Larsen | May 5, 1942 |